(No Model.)

A. H. HARTMANN.
EYEGLASSES.

No. 481,400. Patented Aug. 23, 1892.

WITNESSES:
H. Walker
C. Sedgwick

INVENTOR
A. H. Hartmann
BY
Munn & Co
ATTORNEYS.

UNITED STATES PATENT OFFICE.

ADOLPH H. HARTMANN, OF BROOKLYN, NEW YORK.

EYEGLASSES.

SPECIFICATION forming part of Letters Patent No. 481,400, dated August 23, 1892.

Application filed April 12, 1892. Serial No. 428,795. (No model.)

*To all whom it may concern:*

Be it known that I, ADOLPH H. HARTMANN, of Brooklyn, in the county of Kings and State of New York, have invented a new and useful Improvement in Eyeglasses, of which the following is a full, clear, and exact description.

My invention relates to improvements in eyeglasses, and has for its object to provide an attachment to the glasses which will be capable of holding them in proper alignment with the eyes and of effectually preventing the glasses from dropping downward over the nose or from slipping from the position in which they properly belong.

Another object of the invention is to so construct the attachment that it may expeditiously and conveniently accommodate itself to any shape of nose and in a simple and economic manner attach the device to glasses of any description.

The invention consists in the novel construction and combination of the several parts, as will be hereinafter fully set forth, and pointed out in the claim.

Reference is to be had to the accompanying drawings, forming a part of this specification, in which similar figures of reference indicate corresponding parts in all the views.

Figure 1:
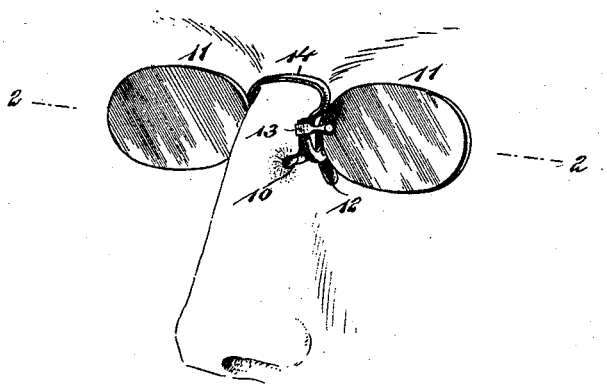
Figure 2:
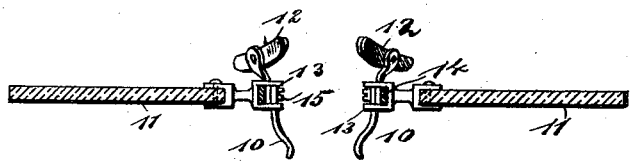

Figure 1 is a perspective view of a pair of glasses having the invention applied thereto and showing the application of the improved eyeglass to the nose of a face. Fig. 2 is a longitudinal section through the glasses, taken practically on the line 2 2 of Fig. 1; and Fig. 3 is a perspective view of one of the clasps detached from the glass.

In carrying out the invention the ordinary construction of an eyeglass is not changed, as the improved device may be attached to an eyeglass without disarranging any of the operative parts thereof.

Figure 3:
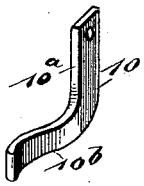

The device is illustrated in detail in Fig. 3; and it consists of an angular bracket-like strip of metal 10, comprising, practically, a vertical body-section $10^a$ and a horizontal foot-section $10^b$, the foot-section being curved in direction of what may be termed the "inner" side of the shank for a portion of its length and at its outer extremity the foot-section is curved or deflected ordinarily in an opposite direction. Thus while the body-section is made practically straight the foot-section is shaped somewhat upon the lines of a compound curve. Two such bracket-strips 10 are employed for an eyeglass and they are attached at any convenient point between the lenses 11, one bracket-strip being near each lens, and they are secured to the glasses through the medium of their vertical or body sections, while their lower or foot sections are inclined in direction of each other. The attachment is so effected that the foot-sections of the strips extend outward some distance in advance of the lateral planes of the lenses and decidedly in advance of the clamps 12, ordinarily employed in connection with eyeglasses.

While the invention is shown as applied to eyeglasses, it will be understood that it may be attached to spectacles also, the attachment in that event being made at the lower portions of the bridge.

In the drawings, the shank or body members of the improved devices are represented as secured by screws to the studs 13, in which the lower ends of the bridge 14 of the glasses are fastened, and I desire it to be distinctly understood that the shank or body members of the devices may be slotted, so that these members may be made vertically adjustable, the attachment being effected through the medium of screws 15, passed through the slots or apertures in the shanks or bodies of the devices and into the predetermined supports therefor. Again, I desire it to be understood that the "auxiliary clamps," as the devices may be properly termed, may form an integral portion of the ordinary clamps, extending outwardly or forwardly therefrom, or they may form an integral portion of the bridge or of the supports to which the bridges are secured. Again, I desire it to be understood that the devices are preferably made of a pliable material, so that their foot-sections may be bent or adjusted through the medium of pliers or by the fingers to clamp in proper manner the nose upon which the glasses are to be worn.

In operation when the improved attachments are applied to glasses or to spectacles and said glasses or spectacles have been placed in proper position upon the nose, as shown in Fig. 1, the foot-sections of the auxiliary clamps will engage with the sides of the nose in advance of the main or ordinary clamps in such a manner that they will maintain the lenses in proper perpendicular position and prevent the glasses from dropping from the nose, no matter how much the head may be oscillated, vibrated, or inclined. This security is obtained by reason of the purchase of the attachment upon opposite sides of the nose, each being inclined toward the other in advance of the ordinary clamps.

The application of the attachment to glasses and the manner in which the glasses are secured when worn and provided with said attachment are clearly shown in Fig. 1.

Having thus described my invention, I claim as new and desire to secure by Letters Patent—

In eyeglasses and spectacles, the combination, with the frame thereof, of bracket-like strips 10, detachably secured to the frame, each strip consisting of a vertical body portion $10^a$ and a horizontal foot-section $10^b$, curved inwardly and then outwardly, said bracket-like strips forming auxiliary clamps to engage the nose in advance of the ordinary clamps, substantially as herein shown and described.

ADOLPH H. HARTMANN.

Witnesses:
J. FRED. ACKER,
C. SEDGWICK.